Dec. 31, 1929.    J. F. O'CONNOR    1,741,649
FRICTION SHOCK ABSORBING MECHANISM
Filed July 18, 1927    2 Sheets-Sheet 2
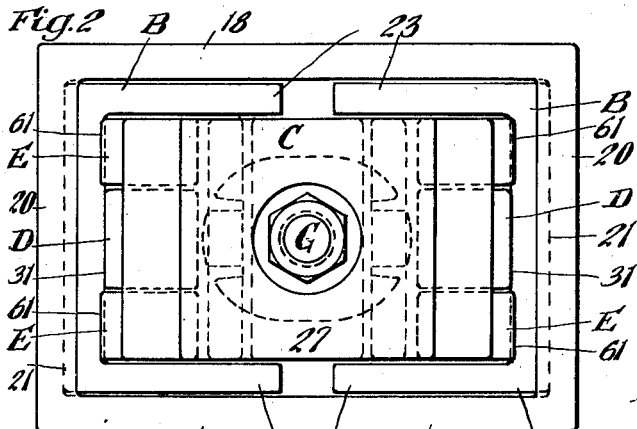
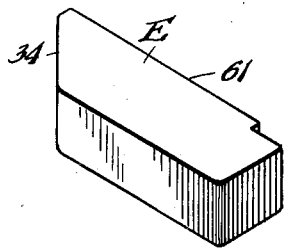
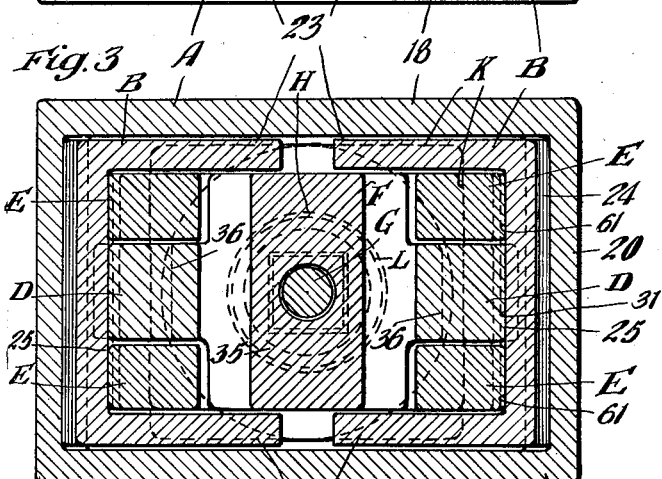
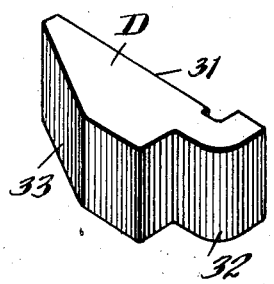
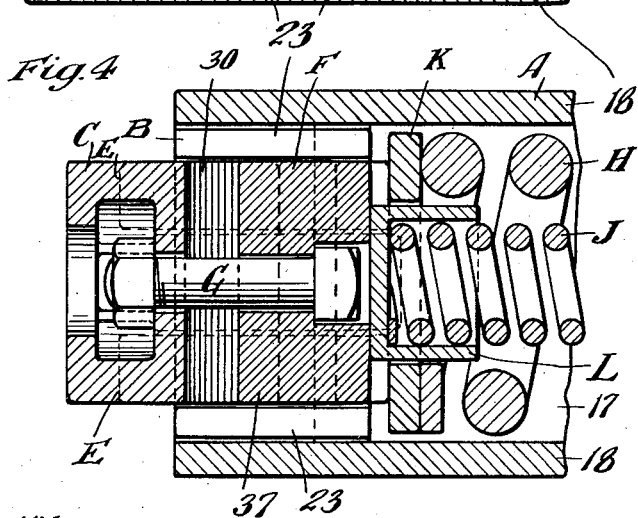
Inventor
John F. O'Connor Patented Dec. 31, 1929

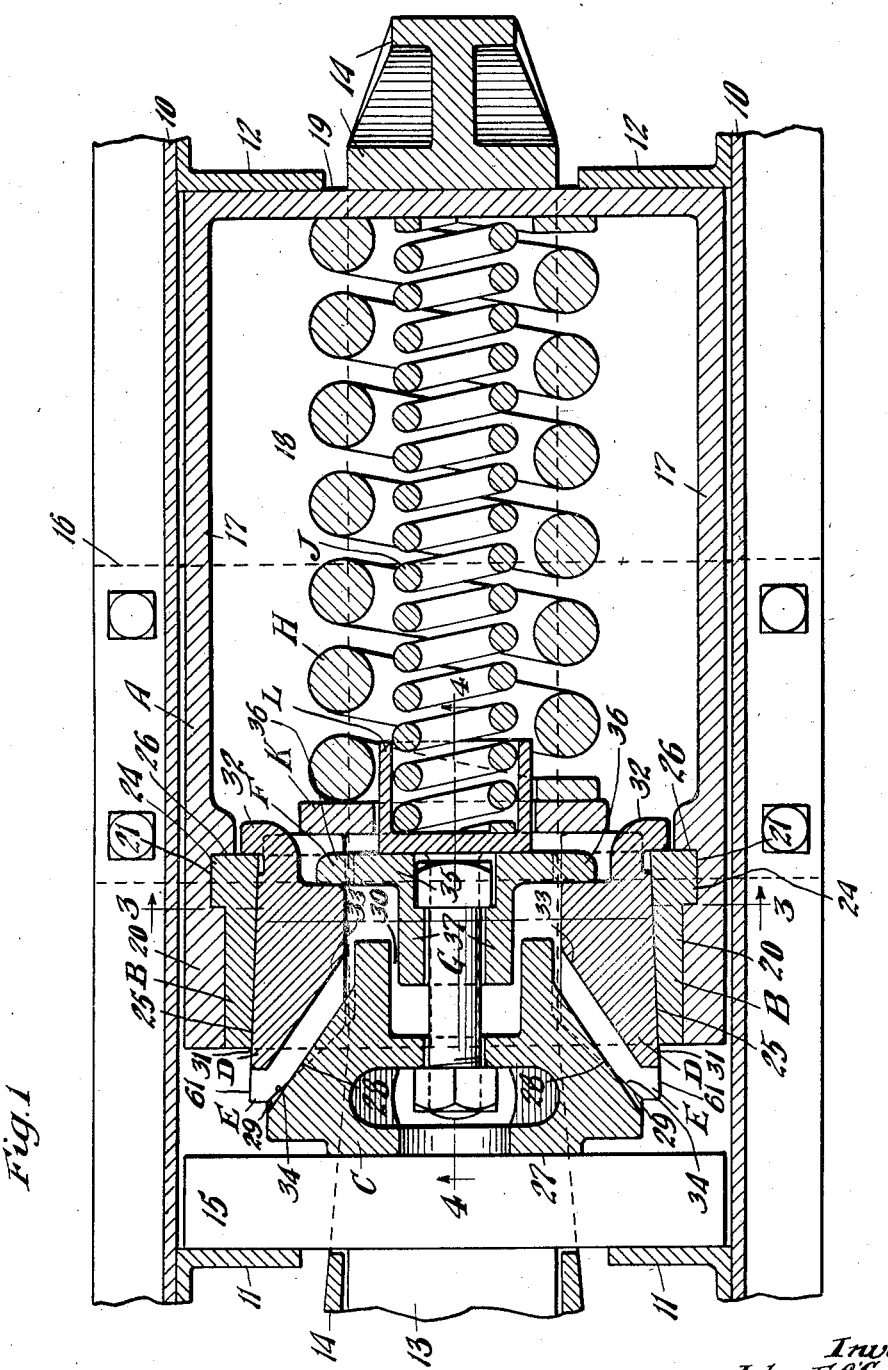

1,741,649

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed July 18, 1927. Serial No. 206,565.

This invention relates to improvements in friction shock absorbing mechanisms.

One object of the invention is to provide a friction shock absorbing mechanism of high capacity especially adapted for railway draft riggings, including a plurality of cooperating friction elements, wherein the friction elements are successively operated to provide for graduated action.

Another object of the invention is to provide a friction shock absorbing mechanism of the character indicated including a column element presenting friction surfaces, wherein one set of friction elements is actuated during the entire compression stroke of the mechanism and another set of friction elements is actuated after a predetermined compression of the mechanism to produce increased frictional capacity during the latter part of the compression stroke of the gear.

Still another object of the invention is to provide a friction shock absorbing mechanism of the character referred to including a plurality of relatively movable cooperating friction elements which are spring-resisted wherein the friction elements are forced into intimate contact by wedge means having relatively blunt wedge faces cooperating with certain of the friction elements during the first part of the compression stroke of the mechanism and the wedge means has keen wedge faces cooperating with the remaining friction elements after a predetermined compression of the mechanism to effect high frictional resistance.

A still further object of the invention is to provide in a friction shock absorbing mechanism simple and efficient retaining means for holding the parts assembled and limiting outward movement of the friction system.

Other objects and advantages of the invention will more clearly appear from the description and claims hereinafter following.

In the drawings, forming a part of this specification,

Fig. 1 is a horizontal, longitudinal sectional view of a portion of a railway draft rigging showing my improvements in connection therewith.

Fig. 2 is a front end elevational view of the shock absorbing mechanism proper.

Fig. 3 is a transverse vertical sectional view corresponding substantially to the line 3—3 of Fig. 1.

Fig. 4 is a longitudinal, vertical sectional view of the front end portion of the shock absorbing mechanism corresponding substantially to the line 4—4 of Fig. 1, and Figs. 5 and 6 are detail perspective views of two of the friction shoes employed in connection with my improved mechanism.

In said drawings 10—10 indicate channel-shaped center or draft sills of a railway car under frame to the inner sides of which are secured the usual front stop lugs 11—11 and rear stop lugs 12—12. The inner end portion of the draw bar is designated by 13 to which is operatively connected a yoke 14 of well known form. The friction shock absorbing mechanism proper as well as a front main follower 15 are disposed within the yoke and the yoke in turn is supported in operative position by a detachable saddle plate 16 secured to the draft sills.

My improved friction shock absorbing mechanism proper, as shown, comprises broadly, a casing A provided with a pair of detachable liners B—B; a wedge block C; two friction shoes D—D; four friction shoes E—E—E—E; an anchoring member F; a retainer bolt G; two spring-resisting elements H and J; a spring follower ring K; and a spring follower cap L.

The casing A is in the form of a substantially rectangular box-like casing having longitudinally disposed vertically spaced side walls 17—17, horizontally disposed longitudinally extending spaced top and bottom walls 18—18 and a transverse rear end wall 19. The end wall 19 cooperates with the rear stop lugs 12 in the manner of the usual rear follower. At the forward end, the side walls 17 are thickened as indicated at 20. Inwardly of the front end of the casing the thickened sections 20 are interiorly vertically slotted as indicated at 21 to provide seats to receive holding means on the liner B.

The liners B, which are two in number, are of similar design, each comprising a relatively heavy vertically disposed plate-like body portion provided with spaced top and bottom inwardly extending flanges 23—23. On the outer side of each liner B is provided a vertically disposed relatively heavy rib 24 at the rear end thereof. The ribs 24 of the liners B are of such a size as to snugly fit the seats 21 so that, when the parts assembled, the liners will be held against longitudinal movement with respect to the casing A. On the inner side, each liner B is provided with a longitudinally disposed flat friction surface 25. The friction surfaces 25 of the opposed liners B converge inwardly of the mechanism as most clearly illustrated in Fig. 1. The liners B are of such a thickness that they project an appreciable distance beyond the inner surfaces of the side walls of the casing A thereby presenting rear abutment faces 26 which cooperate with certain of the friction shoes to limit outward movement of the latter.

The wedge C is in the form of a relatively heavy block having a flat front end face 27 bearing on the inner side of the main follower 15. On the opposite sides at the inner end thereof the wedge block C is provided with two sets of wedge faces, the wedge faces of each set including a central face 28 disposed at a relatively keen wedge acting angle with respect to the longitudinal axis of the mechanism and top and bottom wedge faces 29—29 disposed at a blunter angle with respect to said axis than the wedge faces 28. The rear end portion of the wedge block C is recessed as indicated at 30 to accommodate the front end portion of the anchoring member F as hereinafter explained.

The friction shoes D and E are disposed in sets at opposite sides of the mechanism, each set comprising a centrally disposed friction shoe D and top and bottom friction shoes E—E. The friction shoes D are of similar design, each having a longitudinally disposed flat outer friction surface 31 cooperating with the liner B at the corresponding side of the mechanism. The two shoes E of each set also have longitudinally disposed flat outer friction surfaces 61, which cooperate with the liner B at the same side of the mechanism.

Each shoe D is provided with a rearward extension 32, the extreme end of which is turned outwardly and engages in back of the corresponding liner B thereby positively limiting outward movement of the friction shoe D. At the forward end each friction shoe D is provided with a wedge face 33 on the inner side thereof, the wedge face 33 being preferably disposed at a relatively keen wedge acting angle with respect to the longitudinal axis of the mechanism. Upon reference to Fig. 1 will be seen that the wedge faces 33 of the friction shoes D are normally held in spaced relation to the wedge faces 28 of the wedge block C. The wedge faces 33 are correspondingly inclined to the wedge faces 28 of the block C and are adapted to cooperate therewith after the mechanism has been compressed to a predetermined extent.

The friction shoes E of each set as hereinbefore pointed out are disposed above and below the central friction shoe D of said set. Upon reference to Figs. 1 and 5 it will be seen that the friction shoes E are of greater length than the friction shoes D. At the forward end each friction shoe E is provided with a wedge face 34 on the inner side thereof adapted to cooperate with one of the wedge faces 29 at the same side of the wedge block C and correspondingly inclined to said faces. As will be evident upon reference to Fig. 1, the wedge faces of the friction shoes E are in contact with the wedge faces of the block C in the normal position of the parts when the mechanism is in full release. It is further pointed out that the cooperating wedge faces of the shoes E and the block C are in contact throughout the entire compression stroke of the mechanism.

The anchoring member F comprises a relatively heavy plate-like body portion 35 having laterally extending centrally disposed arms 36 which engage the rear end portions of the friction shoes D only, thereby limiting outward movement of the anchoring member. At the forward side the anchoring member is provided with an extension 37 adapted to work in the opening 30 of the wedge block C. The wedge block C is connected to the anchoring member F by means of a relatively short retainer bolt G having the head thereof disposed within a socket in the anchoring member and the nut disposed within the opening in the wedge block.

The spring resistance means of my improved shock absorbing mechanism is disposed within the casing A and comprises a relatively heavy outer coil H and a lighter inner coil J. Both of the coils H and J have the rear ends thereof bearing directly on the end wall 19 of the casing A. The forward end portion of the spring J is seated within the spring follower cap L which in turn bears on the rear end of the anchoring member F. A spring follower ring K is interposed between the front end of the spring H and the friction shoes E, the spring follower cap L being accommodated within the opening of the ring so as to have free movement. The parts are so proportioned that when the mechanism is assembled both of the spring resistance elements H and J are under initial compression.

With the parts of the mechanism in the normal full release position, as shown in Fig. 1, the spring resistance J, due to the initial compression under which it is placed, forces the anchoring member F against the friction shoes D, thereby holding the latter in their outermost position, outward movement of the same being positively limited by engagement of the extension 32 thereof with the rear end portions of the liners B. The outer spring H, due to the initial compression under which it is placed, tends to force the friction shoes E outwardly thereby holding the same in contact with the wedge block C forcing the latter to its outermost position. As hereinbefore explained, outward movement of the wedge block C is positively limited by the retainer bolt G which is anchored to the anchoring member F, the anchoring member F being held against outward movement by engagement with the inner end portions of the shoes D.

In assembling the parts of my improved mechanism the springs H and J together with the spring follower ring K and the spring follower cap L are first inserted within the casing A through the open front end thereof. The assembled friction system including the anchoring member F, the wedge block C, and friction shoes D and E and the liners B is then inserted within the casing through the front end thereof, the friction system being compressed laterally to an extent to permit the ribs 24 of the liners B to pass freely into the opening of the casing. The parts are forced into the casing until the ribs 24 of the liners register with the seats 21 of the side walls 17, whereupon the friction system is permitted to expand, thus forcibly seating the retaining ribs 24 within the slots or seats 21. As will be evident, when the parts have been thus assembled, the expansive action of the spring resistance H combined with the wedge action between the wedge block C and the shoes E will hold the liners apart thereby maintaining the ribs thereof seated within the slots of the casing.

The operation of my improved shock absorbing mechanism assuming a compression stroke, is as follows: The front follower 15 and the casing A will be moved relatively toward each other thereby carrying the wedge block C inwardly of the mechanism. During the inward movement of the wedge block C the friction shoes E will be carried inwardly in unison therewith and forced apart into intimate contact with the friction surfaces of the liners by the wedge action of the cooperating sets of wedge faces 29 and 34 of the wedge block and shoes. It will be evident that during the inward movement of the friction shoes E the relatively heavy outer coil H of the spring resistance only will be compressed. During the inward movement of the friction shoes E frictional resistance will be produced between the friction surfaces of the shoes and the liners B, in addition to the resistance offered by the spring H. The described action will continue until the clearance between the wedge faces 28 of the wedge block C and the wedge faces 33 of the shoes D is taken up, whereupon the wedge faces 28 and 33 will be brought into wedging engagement and the shoes D forced apart into intimate frictional contact with the liners B. During the further inward movement of the wedge block C the shoes D and E will be forced inwardly in unison, movement of the shoes D being resisted by the central spring J. In this connection it is pointed out that the cooperating sets of wedge faces 28 and 33 are disposed at a keener angle with respect to the longitudinal axis of the mechanism than the cooperating sets of wedge faces 29 and 34. Due to the keen wedge acting angle referred to, the wedge action between the wedge block C and the shoe D is greater than between the block C and the shoe E, thus greatly augmenting the frictional resistance offered during the last portion of the compression stroke. The compression of the mechanism will continue either until the actuating force is reduced or relative movement of the main follower 15 and the casing A is limited by engagement of the follower with the front end of the casing. Upon movement of the follower 15 being limited by engagement with the casing A, the actuating force will be transmitted directly through these parts to the stop lugs of the draft sills, the casing acting as a solid column load transmitting member thereby preventing spring resistance elements H and J from being unduly compressed.

During release of the mechanism, when the actuating force is reduced the expansive action of the springs H and J will cause the shoes D and E to be forced outwardly, movement of the shoes D being limited by engagement of the extensions 32 thereof with the liners B. After movement of the shoes D has been arrested further expansion of the spring H will carry the shoes E outwardly and the wedge block C therewith, until movement of the wedge block is positively limited by the retaining means comprising the retainer bolt G and the anchoring member F. When the parts have been restored to their full released position, the cooperating wedge faces of the wedge C and the shoes D will be spaced apart as shown in Fig. 1, thus providing for preliminary action of the mechanism during which relatively light frictional resistance is had, followed by heavier frictional resistance when the clearance between the wedge C and the shoes D is taken up and the wedge faces thereof brought into cooperative relation.

While I have herein shown and described the preferred manner of carrying out my invention, the same is merely illustrative, and I contemplate all changes and modifications which come within the scope of the claims appended hereto.

I claim:

1. In a friction shock absorbing mechanism, the combination with a column member having longitudinally disposed friction surfaces; of friction shoes having friction surfaces engaging with said column friction surfaces, each of said shoes having a wedge face; a wedge block having wedge faces cooperating with the wedge faces of said shoes, certain of said shoes having the wedge faces thereof in constant engagement with the cooperating wedge faces of said wedge block, and the remaining shoes having the wedge faces thereof normally spaced from the cooperating faces of the wedge block and adapted to be engaged by said cooperating wedge faces of the wedge block after a predetermined compression of the mechanism to effect successive operation of said shoes; and spring-resistance means opposing relative movement of all of said shoes with respect to the column element.

2. In a friction shock absorbing mechanism, the combination with a column element having a longitudinally disposed friction surface; of a plurality of friction shoes having friction surfaces engaging with said column friction surface; a unitary wedge block movable relatively to said column element, said wedge block having wedging engagement with one of said shoes during the entire compression stroke of the mechanism and wedging engagement with another of said shoes after a predetermined compression of the mechanism to produce a graduated increasing frictional resistance during the compression stroke of the mechanism; and yielding means opposing relative movement of said shoes and column element.

3. In a friction shock absorbing mechanism, the combination with a column member having longitudinally disposed friction surfaces; of a unitary wedge block, said wedge block and column being relatively movable; friction shoes forced apart by said wedge block during the entire compression stroke of the mechanism and having frictional engagement with the friction surfaces of the column member; additional friction shoes also having frictional contact with the surfaces of said column member, said additional shoes being engaged by said wedge block after a predetermined compression of the mechanism and moved thereby inwardly of the mechanism; yielding means opposing inward movement of the first named friction shoes; and additional yielding means opposing inward movement of said additional friction shoes independently of said first named shoes.

4. In a friction shock absorbing mechanism, the combination with a column member provided with a friction surface; of a wedge member having a wedge face disposed at a certain angle with respect to the longitudinal axis of the mechanism, said wedge also having an additional wedge face disposed with respect to said axis at an angle different from the angle of said first named wedge face; a friction shoe cooperating with the friction surface of said column member and having a wedge face cooperating with one of the wedge faces of the wedge member; an additional shoe also engaging the friction surface of the column member and having a wedge face normally spaced from the remaining wedge face of said wedge and adapted to cooperate therewith after a predetermined compression of the mechanism; and spring-resistance means opposing movement of said shoes.

5. In a friction shock absorbing mechanism, the combination with a friction shell having interior friction surfaces; of friction shoes cooperating with the shell friction surfaces; a wedge member engaging said shoes, said member and shell being relatively movable toward and away from each other; additional friction shoes engaged by said wedge member after a predetermined inward movement of said first named shoes, said additional shoes also having frictional engagement with the shell friction surfaces; and spring-resistance means opposing inward movement of all of said shoes.

6. In a friction shock absorbing mechanism, the combination with a friction shell having opposed interior friction surfaces; of a pressure transmitting member, said member and shell being relatively movable toward and away from each other, said pressure transmitting member having a set of blunt wedge faces and a set of keen wedge faces; two sets of friction shoes engaging the shell friction surfaces, one of said sets of shoes being provided with blunt wedge faces and the other set being provided with keen wedge faces adapted to be engaged in succession respectively by said sets of blunt and keen wedge faces of the wedge; and means yieldingly opposing relative movement of the friction shoes and shell.

7. In a friction shock absorbing mechanism, the combination with a friction shell having opposed friction surfaces; of a wedge member; a plurality of friction shoes engaging with the shell friction surfaces, said shoes and wedge having cooperating wedge faces; additional friction shoes engaging with said shell friction surfaces, said additional shoes and wedge having cooperating sets of wedge faces normally out of contact, said last named sets of wedge faces being disposed at an angle to said first named set of wedge faces; and means yieldingly opposing inward movement of all of said shoes.

8. In a friction shock absorbing mechanism, the combination with a friction shell having interior opposed friction surfaces; of a wedge block, said block and shell being relatively movable toward and away from each other; a plurality of friction shoes engaging the shell friction surfaces, said shoes and wedge block having cooperating sets of wedge faces disposed at a certain angle with respect to the longitudinal axis of the mechanism; additional friction shoes also having frictional engagement with said shell surfaces, said additional shoes and said wedge having cooperating sets of wedge faces normally spaced apart and disposed at a keener angle than said first named sets of faces with respect to said longitudinal axis of the mechanism; and spring-resistance means opposing inward movement of the shoes.

9. In a friction shock absorbing mechanism, the combination with a friction shell having opposed interior friction surfaces; of a wedge block; a plurality of friction shoes engaging said shell friction surfaces and having wedging engagement with said wedge block; additional friction shoes having frictional engagement with said shell surfaces; means for limiting outward movement of said additional shoes and normally holding the same spaced from said wedge block, said additional shoes and wedge block having cooperating sets of wedge faces adapted to engage after a predetermined compression of the mechanism; and yielding means opposing inward movement of all of said shoes.

10. In a friction shock absorbing mechanism, the combination with a friction shell having opposed walls thereof provided with detachable liners, said liners presenting interior friction surfaces; friction shoes cooperating with the liners; a wedge member engaging said shoes; means for limiting outward movement of the wedge member; a spring resistance yieldingly opposing inward movement of the shoes; additional friction shoes having frictional engagement with the liners; cooperating sets of wedge faces on said additional shoes and said wedge member; means on said additional shoes engaging the liners to limit the outward movement of said additional shoes and holding the wedge faces thereof normally spaced thereof from the cooperating wedge faces of the wedge block; and additional spring resistance means opposing inward movement of said additional shoes.

11. In a friction shock absorbing mechanism, the combination with a friction shell; of a wedge member; friction shoes cooperating with said shell and having wedge faces adapted to be engaged by the wedge block; means for limiting outward movement of said shoes; means anchored to the shoes for limiting outward movement of the wedge block; additional friction shoes having wedging engagement with the wedge block and cooperating with the friction shell; spring-resistance means opposing inward movement of said additional shoes, said spring-resistance being under initial compression and forcing said additional shoes outwardly against the wedge block to hold the latter normally spaced from the wedge faces of said first named shoes; and spring means cooperating with said anchoring means to yieldingly oppose inward movement of said first named shoes and normally force the same to their outermost position.

12. In a friction shock absorbing mechanism, the combination with a rectangular cage; of interior, detachable liners secured to the side walls of the cage; a wedge block having a set of wedge faces on each side thereof; each set of wedge faces comprising at least one wedge face disposed at a more acute angle to the longitudinal axis of the mechanism than the remaining wedge faces; means for limiting outward movement of the wedge block; friction shoes adapted to cooperate with said acute faces of the wedge; means yieldingly opposing inward movement of said shoes; means for limiting outward movement of said shoes to hold the wedge faces thereof normally spaced from the acute faces of the wedge block; additional friction shoes having wedge faces cooperating with said remaining wedge faces of the bock; and means yieldingly holding said additional shoes in contact with the wedge and opposing inward movement of said additional shoes.

In witness that I claim the foregoing I have hereunto subscribed my name this 11th day of July, 1927.

JOHN F. O'CONNOR.